United States Patent
Bakshi et al.

(10) Patent No.: US 9,922,426 B2
(45) Date of Patent: Mar. 20, 2018

(54) REDUCING LATENCY IN PRESENTING MAP INTERFACES AT CLIENT DEVICES

(71) Applicant: Google Inc., Mountain View, CA (US)

(72) Inventors: Nikhil Bakshi, Mountain View, CA (US); Oliver Michael King, Mountain View, CA (US); Zev Nettleton Youra, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/005,820

(22) Filed: Jan. 25, 2016

(65) Prior Publication Data

US 2017/0212909 A1    Jul. 27, 2017

(51) Int. Cl.

| | |
|---|---|
| *G06T 7/11* | (2017.01) |
| *G06T 3/40* | (2006.01) |
| *G06T 9/00* | (2006.01) |
| *G06T 11/00* | (2006.01) |
| *G06F 17/30* | (2006.01) |
| *G06T 1/20* | (2006.01) |
| *G06T 11/20* | (2006.01) |
| *G06T 1/60* | (2006.01) |

(Continued)

(52) U.S. Cl.
CPC ............ *G06T 7/11* (2017.01); *G06F 17/3028* (2013.01); *G06F 17/30241* (2013.01); *G06T 1/20* (2013.01); *G06T 1/60* (2013.01); *G06T 3/40* (2013.01); *G06T 9/00* (2013.01); *G06T 11/001* (2013.01); *G06T 11/20* (2013.01); *G06T 11/40* (2013.01); *G06F 3/04842* (2013.01); *G06F 2203/04806* (2013.01); *G06T 2200/16* (2013.01); *G06T 2207/20104* (2013.01)

(58) Field of Classification Search
None
See application file for complete search history.

(56) References Cited

U.S. PATENT DOCUMENTS 6,107,961 A    8/2000   Takagi
6,580,823 B1   6/2003   Englefield et al.
(Continued)

OTHER PUBLICATIONS

International Search Report and Written Opinion in International Application No. PCT/US2016/064399, dated Mar. 31, 2017, 15 pages.

(Continued)

*Primary Examiner* — Hilina K Demeter
(74) *Attorney, Agent, or Firm* — Fish & Richardson P.C.

(57) ABSTRACT

Methods, systems, and apparatus, including computer programs encoded on a computer storage medium, for reducing latency in transmitting and presenting map user interfaces. In one aspect, a method includes receiving, from a client device, a request for presentation of an interactive map user interface that depicts (i) a region and (ii) data related to an account for sub-regions of the region. One or more servers render a map of the region. The server(s) generate an image file representing an image of the rendered map. A different visual characteristic is assigned to each different sub-region. The server(s) configure a user interface of the client device to present (i) the image with each of the different sub-regions being presented according to the different visual characteristics and (ii) account data related to a sub-region when the client device detects a user interaction with the sub-region.

20 Claims, 4 Drawing Sheets

(51) Int. Cl.
  *G06T 11/40* (2006.01)
  *G06F 3/0484* (2013.01)

(56) References Cited

U.S. PATENT DOCUMENTS

| | | | |
|---|---|---|---|
| 7,421,115 B2 | 9/2008 | Schoelkopf et al. | |
| 7,707,379 B2 | 4/2010 | Bartley et al. | |
| 7,746,343 B1* | 6/2010 | Charaniya | G06F 3/04815 345/428 |
| 8,649,968 B2 | 2/2014 | Cooper et al. | |
| 8,781,735 B2* | 7/2014 | Udeshi | G01C 21/30 340/995.17 |
| 2003/0231190 A1 | 12/2003 | Jawerth et al. | |
| 2008/0192053 A1* | 8/2008 | Howell | G06F 17/30241 345/427 |
| 2008/0301643 A1 | 12/2008 | Appleton et al. | |
| 2011/0202510 A1* | 8/2011 | Salemann | G06F 17/30241 707/693 |
| 2012/0127128 A1 | 5/2012 | Large et al. | |
| 2012/0213416 A1* | 8/2012 | Lorimer | G06F 17/30241 382/113 |
| 2013/0101214 A1* | 4/2013 | Sample | G09B 29/003 382/173 |
| 2013/0321400 A1* | 12/2013 | van Os | G06T 15/005 345/419 |
| 2013/0325343 A1* | 12/2013 | Blumenberg | G01C 21/00 701/533 |
| 2013/0328941 A1* | 12/2013 | Carbonneau | G06T 11/00 345/667 |
| 2014/0078183 A1* | 3/2014 | Watson | G06T 3/40 345/667 |
| 2014/0173520 A1 | 6/2014 | Sheha et al. | |
| 2014/0375678 A1* | 12/2014 | Kjeldergaard | G06T 3/40 345/629 |
| 2015/0070379 A1* | 3/2015 | Fan | G06T 15/08 345/594 |
| 2016/0018951 A1* | 1/2016 | Grabar | G06F 3/0481 715/765 |
| 2016/0306824 A1* | 10/2016 | Lopez | G06T 3/4092 |
| 2017/0052747 A1* | 2/2017 | Cervelli | G06F 3/0482 |

OTHER PUBLICATIONS

Anonymous. "Oracle Fusion Middleware User's Guide for Oracle MapViewer 11g Release 1 (11.1.1) E10145-02," Jun. 1, 2009 [retrieved on Sep. 15, 2011] Retrieved from Internet URL<http://www.art2dec.com/documentation/docs/fmw11g1111documentation/web.1111/e10145/pdf> 361 pages.
Schmidt et al. "Working Paper 2008-13 A Scalable Tile Map Service for Distributing Dynamic Choroplyth Maps," Jan. 31, 2008, 5 pages.

* cited by examiner

REDUCING LATENCY IN PRESENTING MAP INTERFACES AT CLIENT DEVICES

BACKGROUND

The Internet facilitates the exchange of information and transactions between users across the globe. This exchange of information enables data providers to provide data to a variety of users. An example of information provided over the Internet is an interactive map that enables users to search for and view maps of particular areas. As these map user interfaces can include a lot of information and may be generated using many different scripts, canvases, and graphics, rendering the maps can be resource intensive and take some time to render at client devices.

SUMMARY

This specification describes technologies relating to reducing latency in transmitting and presenting map user interfaces.

In general, one innovative aspect of the subject matter described in this specification can be embodied in methods that include the actions of receiving, from a client device, a request for presentation of an interactive map user interface that depicts (i) a particular geographic region and (ii) data related to an online account for multiple different sub-regions of the particular region; rendering, by one or more servers and using a mapping service, a map of the particular region, the rendering comprising generating a canvas of the particular region and loading programming elements and graphic elements that are used to generate the map; generating, by the one or more servers and based on the rendered map, an image file representing an image of the rendered map, wherein the image file is renderable using fewer computing resources than required to generate the canvas; detecting one or more sub-regions within the image based at least on visual borders depicted by the image; assigning a different visual characteristic to each different sub-region within the image; generating an electronic index that maps each location within the image to a corresponding sub-region that includes the location; and configuring, by the one or more servers, a user interface of the client device to present (i) the image with each of the different sub-regions being presented according to the different visual characteristic corresponding to the different sub-region and (ii) account data related to at least one given sub-region when the client device detects a user interaction with the given sub-region of the image. Other embodiments of this aspect include corresponding systems, apparatus, and computer programs, configured to perform the actions of the methods, encoded on computer storage devices.

These and other embodiments can each optionally include one or more of the following features. In some aspects, the visual characteristic for each sub-region includes a particular color assigned to the sub-region and that is presented within the sub-region in the image.

Some aspects can include reducing a data size of the image file using compression techniques that include: assigning, to each sub-region of the image, a particular red, green, blue (RGB) color in which the sub-region of the image is presented and storing, in the image file and for each particular sub-region, the RGB color for the sub-region and data specifying locations of the particular sub-region within the image.

Some aspects can include receiving, at the one or more servers and from the client device, data specifying a selection of a particular location within the image. An updated image file can be generated that depicts a map of the particular sub-region that corresponds to the selected location in response to the selection. This generating can include rendering a map of the particular sub-region using the mapping service and generating an image of the rendered map. An image file representing the updated image can be provided to the client device. Some aspects can include receiving, from the client device, data specifying a zoom level for the image at the time of the selection. A level of granularity for the selection can be determined based on the zoom level. The particular sub-region that corresponds to the selected location can be determined based on the level of granularity for the selection.

In some aspects, the image file includes a Portable Network Graphics (PNG) file format. Some aspects can include providing, by the one or more servers and to the client device, one or more additional image files that each represents a map of at least one of the sub-regions in response to the request and prior to receiving a request for the one or more additional image files.

Particular embodiments of the subject matter described in this specification can be implemented so as to realize one or more of the following advantages. The latency in providing and presenting an interactive map user interface at a client device can be reduced by providing a compressed image file with an index to data that can be presented in response to user interactions, rather than loading scripts, canvases, graphics, Document Object Model (DOM) elements and other data onto the client device. For example, the amount of networking resources required to provide an image file (e.g., a compressed image file) over the Internet may be substantially less than the amount of networking resources required to provide scripts, canvases, and DOM elements used to generate the map at the client device.

Similarly, the demand placed upon computing resources of the client device can be reduced using the compressed image file as the client device's processor does not have to load the scripts or DOM elements or generate the canvases. In addition, the amount of memory (e.g., RAM) of the client device used to present the interactive map user interface can be reduced using the image file, which frees up memory for other applications and increases the speed at which data is processed by the client device. By assigning a particular color to each entire sub-region of a map image, the size of the image file that stores the image can be reduced (e.g., compressed), resulting in faster transmission times between devices and less consumed network bandwidth used to transmit the image file.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

A system can reduce the latency in providing and presenting interactive map user interfaces. For example, the system can generate an image of a map generated by a mapping service. The image can depict a map of a particular region and its sub-regions. The system can also generate an electronic index that maps locations within the image (e.g., x-y coordinates of the image) to the sub-regions of the image and provide the electronic index and the image to a client device. The electronic index can also map the sub-regions to data for the sub-regions. In this way, when a user interacts with the image of the map at a location that corresponds to a particular sub-region, e.g., by hovering over or selecting a location that corresponds to the sub-region, data for the sub-region can be presented to the user in an interactive way.

Providing the image to the client device, e.g., over the Internet, can require less computing and networking resources than generating a map at the client device using a mapping service. This also increases the speed at which map user interfaces are presented to the user. The amount of computing and networking resources can be further reduced, and the speed further increased, by compressing the image. In some implementations, the image can be compressed by assigning a particular color to each sub-region of the image. For example, an entire sub-region may be depicted in the particular color assigned to the sub-region rather than depicting different colors for roads, terrain, etc. In this way, the size of the image file can be reduced, allowing for quicker transfer over a network and less network bandwidth to transfer the image over the network. For example, because all of the area of a given sub-region is the same color, only a single color code (e.g., RGB value) needs to be sent for the entire area of the image representing the sub-region rather than sending different color codes for multiple different portions of the sub-region. In addition, the client device can present the compressed image quicker using compressed image rendering technologies, e.g., implemented by graphics processing units (GPUs).

To further reduce latency in presenting interactive user interfaces, additional images of maps may be provided prior to the maps being requested. The additional map images can be stored at the client device, e.g., in a cache, to enable quicker presentation of the maps if the user requests the maps. For example, the system may provide more detailed maps of each sub-region depicted in the image generated in response to the request in case the user selects one of the sub-regions for a more detailed view.

Figure 1:
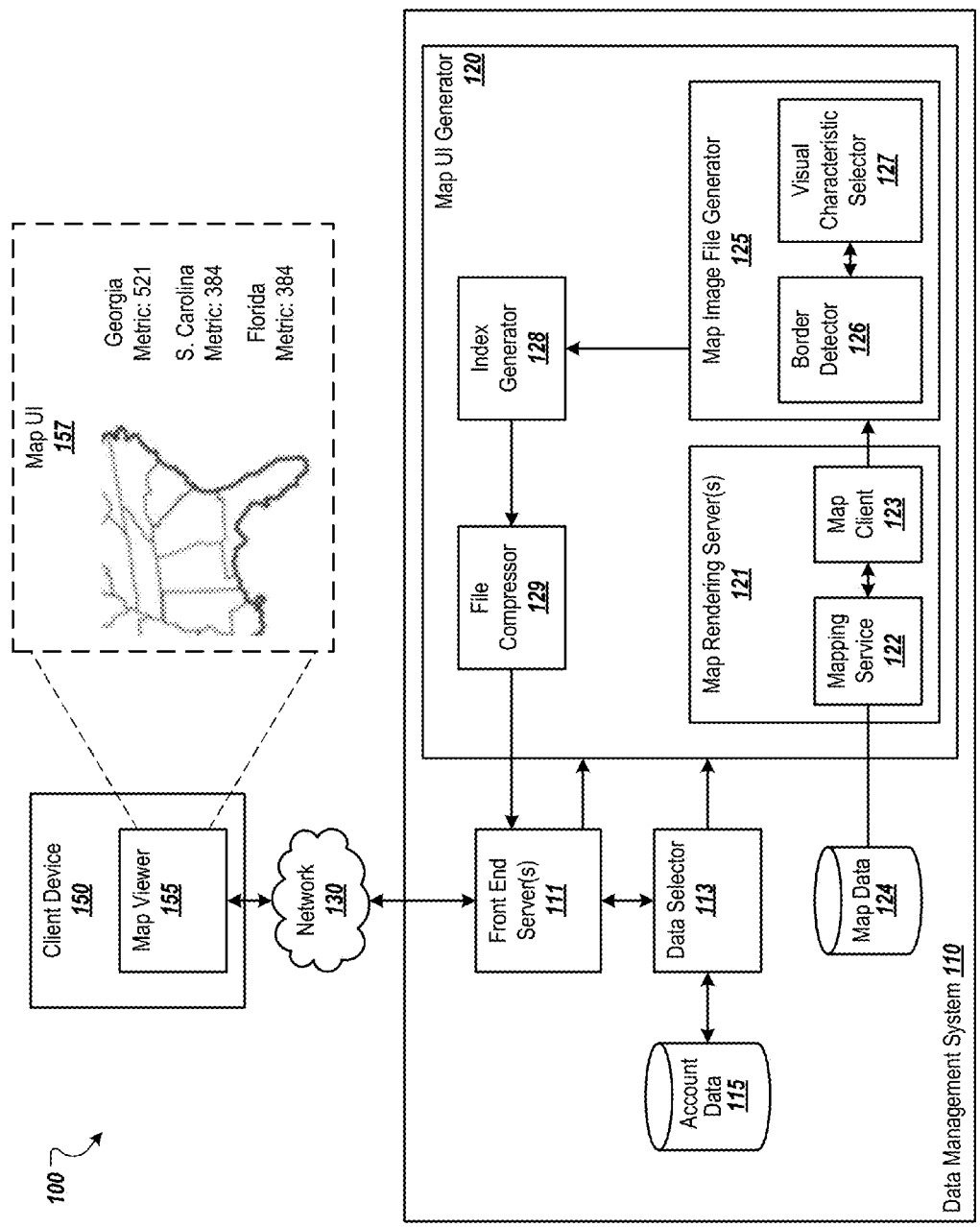
FIG. 1 is an environment in which a data management system provides interactive map user interfaces.

FIG. 1 is an example environment 100 in which a data management system 110 provides interactive map user interfaces. For example, the data management system 110 may provide interactive map user interfaces to client devices, e.g. the client device 150, in response to requests received from the client devices. The data management system 110 can send the interactive map user interfaces over a data communication network 130, e.g., a local area network (LAN), a wide area network (WAN), a mobile communication network, the Internet, or a combination thereof. The network 130 can include servers, hubs, routers, switches, interface devices, transmission media, and other networking components that enable devices to send and receive data to other devices.

A client device 150 is an electronic device that is capable of requesting and receiving electronic resources and other data over a network 130. Example client devices 150 include personal computers, mobile communication devices (e.g., smartphones, tablet computing devices, and/or smart watches), and other devices that can send and receive data over the network 130. A client device 150 typically includes a user application, such as a web browser, to facilitate the sending and receiving of data over the network 130. The web browser can enable a user to interact with text, images, videos, music, and other information typically located on a web page at a website.

A client device 150 can include other applications, e.g., native applications developed for a particular type of device or for a particular platform. For example, the client device 150 includes a map viewer 155 that presents interactive map user interfaces 157 to a user of the client device 150. The map viewer 150 may be implemented in a web browser, a native application, or another type of application program.

Figure 2:
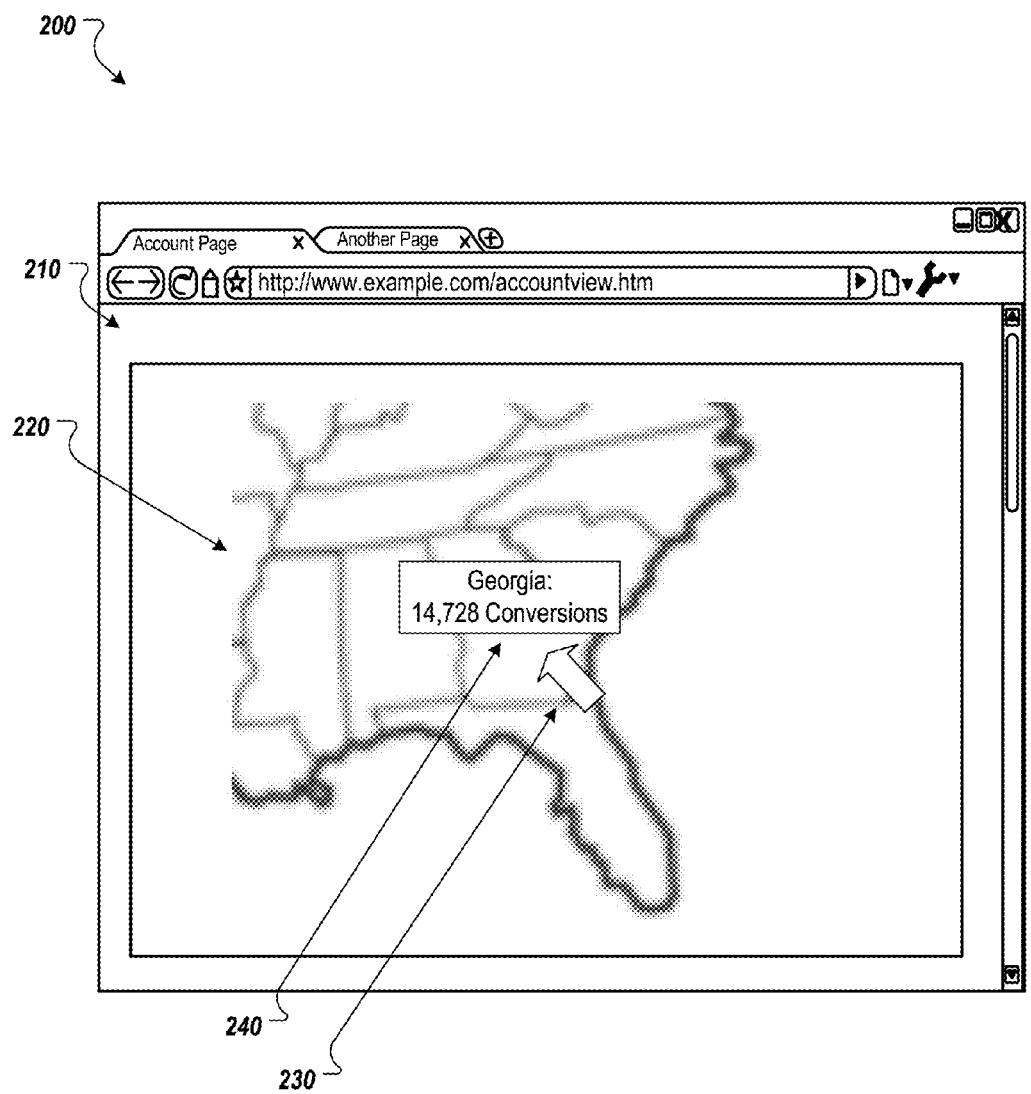
FIG. 2 is a screenshot of an example interactive map user interface.

The interactive map user interface 157 presents a map of a particular region. For example, the interactive map user interface 157 can present a map of a particular region specified by a request received from the client device 150. The interactive map user interface 157 can also present data related to the particular region and/or sub-regions of the region included in the map. As described below, the presented data can include account data related to an online account that the user of the client device 150 is authorized to access. The data can be presented in response to user interactions with the map. For example, if a user of the client device 150 hovers a cursor or other pointer over a location that corresponds to a particular sub-region, the data for the sub-region may be presented to the user. An example interactive map user interface is illustrated in FIG. 2 and described in more detail below.

The data management system 110 can manage data for users and/or organizations and provide the data for presentation to the users, e.g., in user interfaces generated by the data management system 110. For example, the data management system 110 can manage online account data for multiple different accounts of multiple different account holders. In a particular example, the data management system 110 can manage advertising account data for multiple different organizations. The systems and techniques described below can also be applied to various other types of data.

The account data managed by the account management system 110 can include any data related to an account, such as performance data for content items (e.g., number of impressions, click through rates, conversion rates, etc.), budget information for account holders, and/or content item distribution criteria. The account data for each account holder is stored in an account data storage device 115, which may include multiple data storage devices located in one or more data centers. The account data for each account holder may be stored separately and securely such that account data for one account holder is not provided to users of a different account holder.

At least a portion of the account data can be stored with data identifying a corresponding geographic location for the data. For example, data for an advertising campaign may include data specifying a number of impressions of a content item, a number of selections of the content item, a number of conversions resulting from presentations of the content item, and/or other appropriate campaign data. The data for each event (e.g., impression, selection, conversion, etc.) can include a designation of the geographic location at which the event occurred. For example, if the content item was presented on a client device located in Seattle, the data for the impression can indicate that the impression occurred in Seattle. In this way, the data can be filtered based on location and metrics associated with each location can be determined.

The data management system 110 includes one or more front-end servers 111, a data selector 113, and a map user interface generator 120. The data selector 113 and the map user interface generator 120 can also be implemented in one or more servers. For example, the front-end server(s) 111, the data selector 113, and the map user interface generator 120 may be implemented in one or more servers located in one or more locations (e.g., data centers). The front-end server(s) 111, data selector 113, and user interface generator 120 can communicate data between each other, for example, over a network.

The front-end server(s) 111 receive requests for data from client devices and provides the requested data to the client devices. The front-end server(s) 111 can act as an interface between client devices and the data selector 113 and the map user interface generator 120. For example, the front-end server(s) 111 can forward requests for data to the data selector 113. In turn, the data selector 113 can obtain the appropriate data from the account data storage device 115 and provide the data to the front-end server(s) 111. The front-end server(s) 111 can then provide the data to the client device that submitted the request.

The front-end server(s) 111 can also determine whether a received request is requesting a map user interface. For example, the request may specify that it is requesting a map user interface that depicts account data for a particular region. In another example, the user of a client device may interact with a map user interface in a manner that triggers a request for another map user interface. For example, the user may zoom in or out of a map user interface to view a different region or a more detailed view of a sub-region. In this example, the request may specify the region to include in a map user interface.

If the front-end server(s) 111 determines that a request is requesting a map user interface, the front-end server(s) 111 can request a map user interface from the map user interface generator 120. The map user interface generator 120 can generate an interactive map user interface for the requested region and provide the interactive map user interface to the front-end server(s) 111. In turn, the front-end server(s) 111 provide the interactive map user interface to the client device.

In some implementations, the data selector 113 can determine whether to provide a map user interface to a client device 150. For example, the data selector 113 may determine whether to provide a map user interface based on the data that is being provided to the client device 150. The data selector 113 may determine to provide a map user interface if the data includes data specific to multiple different geographic locations. For example, the data may include, for each of the multiple different geographic locations, a conversion rate for a content item when the content item has been provided in the geographic location. In this example, the data selector 113 may determine to provide a map user interface that presents the conversion rates at their appropriate locations on the map.

The map user interface generator 120 generates interactive map user interfaces that present data for geographic locations depicted in the map. For example, the map user interface generator 120 may generate an interactive map user interface that depicts a map of a particular region specified by a request received from a client device. The interactive map user interfaces generated by the map user interface generator 120 can include an image of a more complex map and an index of data that corresponds to geographic locations depicted by the image. In this way, the latency in rendering the interactive map user interface at the client device 150 can be reduced as compared to generating the map at the client device 150 using code (e.g., scripts), DOM elements, and other data obtained from a mapping service. In addition, the demand on the computing resources of the client device 150 used to render the interactive map user interface can be reduced, thereby improving the performance of the client device 150.

The map user interface generator 120 includes one or more map rendering servers 121. The map rendering server(s) 121 can use a mapping service 122 and a map client 123 to render maps of geographic regions. The mapping service 122 can include a web mapping service that provides maps or portions of maps to map clients 123 in response to requests for maps. For example, the mapping service 122 may select map tiles, overlays, and other map data to provide to the map client 123 based on a request for a map of a particular region. The mapping service 122 can select the map tiles, overlays, and other map data from a map data storage device 124.

The map client 123 can request maps from the mapping service 122, organize map data received from the mapping service, and render the map. In some implementations, the map client 123 uses multiple scripts to generate a map canvas, organize map tiles on the canvas, arrange overlays over the map tiles, locate other map data on the map, and render the map, e.g., at a display or in memory. To render the map, the map client 123 may also load multiple DOM elements that are used by the scripts to render maps.

The map client 123 can interact with the mapping service 122 to render maps requested by client devices, e.g., the client device 150. By rendering the map at the map rendering server(s) 121 rather than at the client device 150, the map can be rendered more quickly as the map rendering server(s) have more powerful and a greater number of computing resources with which to render the map. In addition, the map client 123 can interact with the mapping service 122 without submitting requests over the Internet, further reducing the amount of time required to render a map.

The map user interface generator 120 also includes a map image file generator 125, an index generator 128, and a file compressor 129. The map image file generator 125 can generate an image of the map rendered by the map client 123 and generate an image file that represents the image. For example, the map image file generator 125 may capture a screenshot of the rendered map and generate an image file that represents the captured image. The image file may be a Portable Network Graphics (PNG) file, a Graphics Interchange Format (GIF) file, a Joint Photographic Experts Group (JPEG) file, or another appropriate type of image file.

The map image file generator 125 includes a border detector 126 and a visual characteristic selector 127. The border detector 126 can detect visual borders within the image of the map generated by the map image file generator 125. For example, the image may depict a particular region that includes sub-regions defined by borders. In a particular example, the region may be the United States and the sub-regions may be the individual states. The border detector 126 can use border detecting techniques, e.g., edge detection, to detect the borders between the sub-regions.

In some implementations, the border detector 126 can also identify the sub-regions depicted by the image based on the borders and/or on data specifying the region depicted by the image. For example, knowing the region and the sub-regions within the image, the border detector 126 can determine which bordered areas of the image correspond to each sub-region. The border detector 126 can determine the sub-regions by comparing shapes defined by the borders in the image and known shapes for each sub-region.

The visual characteristic selector 127 can select a visual characteristic to associate with each sub-region depicted in the image of the map. For example, the visual characteristic may be a color (e.g., based on the RGB color model or the Red, Green, Blue, Alpha (RGBA color model)), a shading, a hatching, a color intensity, or some other appropriate visual characteristic. In some implementations, the visual characteristic selector 127 selects the visual characteristic for each sub-region based on data for each sub-region. For example, the interactive map user interface may be generated to present the performance of content items when the content items are presented at client devices located in the sub-regions. In this example, the visual characteristic selector 127 may select the visual characteristic for each sub-region based on the performance measure for each sub-region. A sub-region in which the content item has a better performance may be presented in a brighter color than a sub-region in which the content item has poorer performance.

In another example, each sub-region may be depicted in the same color, while the shade or brightness of the color varies based on the data for the sub-region. For example, each sub-region may be depicted in the color blue. The visual characteristic selector 127 may select a brightness or shade of blue for each sub-region based on the data for each sub-region. In yet another example, the visual characteristic of each sub-region may be selected randomly or pseudo-randomly to differentiate the different sub-regions.

The index generator 128 can generate an electronic index that maps locations within the image of the map to sub-regions depicted in the image. For example, the electronic index may map each x-y coordinate of the image to its corresponding sub-region. The electronic index may also map data for each sub-region to the sub-regions depicted by the image of the map. For example, the index generator 128 can obtain the data for the sub-regions from the data selector 113. In some implementations, the electronic index maps the data for a sub-region to a unique visual characteristic (e.g., unique RGB or RGBA value) assigned to the sub-region. In this way, when a user interacts with the image at the sub-region, e.g., at one of the x-y coordinates for the sub-region or the unique visual characteristic, the data for the sub-region can be obtained from the index and presented to the user.

The file compressor 129 can compress the image file that represents the image of the map for faster transfer over the network 130 and faster rendering to a user of the client device 150. In some implementations, the file compressor 129 compresses the image file using the unique visual characteristic selected for each sub-region depicted in the image. For example, the unique visual characteristic for each sub-region may be a unique color assigned to each sub-region. In the example, the file compressor 129 can compress the image file by assigning to the image area for each particular sub-region the unique color of that sub-region. In this way the image file only has to store, for each sub-region, the x-y coordinates that correspond to the sub-region and the RGB color value for the sub-region. An application of the client device 150 (e.g., a web browser) can use the x-y coordinates for each sub-region and the unique RGB color for each sub-region to render the image of the map at the client device 150.

The file compressor 129 provides the compressed image file and the electronic index generated by the index generator 128 to the front-end server(s) 111. In turn, the front-end server(s) provide the image file and the index to the client device 150. The map viewer 155 of the client device 150 can then render the image of the map represented by the image file in an interactive map user interface.

The front-end server(s) 111 can also provide code, routines, or scripts to the client device 150 that causes the client device 150 to perform certain operations in response to certain user interactions with the image of the map. For example, a script may cause the client device 150 to access the electronic index to obtain and present data related to a particular sub-region in response to the user hovering a pointer (e.g., mouse cursor) over a location of the image that corresponds to the particular sub-region. For example, if a user hovers a pointer over a particular sub-region, the client device 150 can obtain the data for the particular sub-region from the electronic index and present the data to the user of the client device 150. The client device 150 can identify the sub-region for which to obtain data based on a location of the user interaction with respect to the image of the map. For example, the client device 150 can detect the x-y coordinates of the pointer during a hover event (e.g., the pointer remaining in the same position for at least a threshold amount of time) and obtain data from the electronic index that corresponds to the detected x-y coordinates. In another example, the client device 150 can determine the color of the image at the location of the pointer during a hover event and obtain data from the electronic index that corresponds to the color.

In some implementations, the map user interface generator 120 generates two images of the map. The first image may be an image of the map rendered by the map rendering server(s). For example, the first image may depict the rendered map with any roads, waterbodies, colors for types of terrain, etc. The second image may be an image that has particular RGB colors for particular sub-regions. In this example, the second image may be an overlay over the first image, but not visible to the user of the client device 150. Instead, the second image may be used to map the location of user interactions to the sub-regions depicted in the image, as described above. In this way, the map presented to the user can look the same as maps typically provided by the mapping service 122, while still realizing the improvements in rendering speed and network bandwidth consumption.

In some implementations, the map user interface generator 120 generates additional images of maps and indexes and provides each of the additional images and indexes to the client device 150 in response to a request for an interactive map user interface. For example, the request may specify a particular region that includes multiple sub-regions. In this example, the map user interface generator 120 may generate an image of a map for each sub-region and an electronic index for each sub-region. The image of a particular sub-region may depict sub-regions of the particular sub-region. Similarly, the electronic index for a particular sub-region may include data for each sub-region of the particular sub-region.

The map user interface generator 120 can transmit the additional images and electronic indexes to the client device 150 with the original image generated in response to the request or after the original image has been transmitted to the client device 150. The client device 150 can store the additional images and electronic indexes in a cache of the client device 150. The client device 150 can present the additional images in response to user interaction with the interactive map user interface that includes the original image (or another image). For example, the user may select a particular sub-region depicted by the original image. In response, the client device 150 can obtain the image of the selected sub-region from the cache and present the image without requesting a new interactive map user interface from the data management system 110. In this way, detailed maps of the sub-regions can be rendered much more quickly and network traffic can be reduced.

FIG. 2 is a screenshot 200 of example interactive map user interface 210. In this example, the interactive map user interface 210 is presented in a web browser. In some implementations, the interactive map user interface 210 is presented by another application program, e.g., a native application.

The example interactive map user interface 210 includes an image 220 of a map of a particular region. In this example, the image 220 of the map depicts several southeastern states. Each state is a sub-region of the southeast region. Although not shown in FIG. 2, each state can include a visual characteristic specific to that state. For example, the visual characteristic may be a color (e.g., based on the RGB color model), a shading, a hatching, a color intensity, or some other appropriate visual characteristic that differentiates the different states. In a particular example, the state of Georgia may be green, while the state of Alabama may be blue. In another example, each state may be the same base color. However, each state may be a different intensity, shade, or brightness of that color. For example, each state may be a different shade of blue.

The visual characteristic for each state may be based on data that corresponds to each state. For example, the interactive map user interface 210 may present, for each state, the number of conversions resulting from the presentation of a particular content item in that state. In this example, the area of each state may be presented in the same color with the shade of the color being based on the number of conversions for each state. For example, the state with the most conversions may be the darkest, while the state with the fewest conversions may be the lightest.

The data for each state can be stored in an electronic index that maps the data and visual characteristic to each state. When the user interacts with a state, e.g., by hovering a cursor over the state or selecting the state, the data for that state can be presented. For example, the state of Georgia is being hovered over by a cursor 230. In response, the number of conversions for a content item that occurred as a result of the content item being presented on a device located in Georgia is being presented in an overlay 240. The overlay 240 is presented over the image 220. In particular, the overlay 240 is presented over the state of Georgia in the image 220.

In some implementations, a first type of user interaction may cause presentation of data over the image 220 and a second type of user interaction may cause a different map to be presented in the interactive map user interface 210. For example, a hover over a state may cause data for the state to be presented in an overlay over the state. In addition, a selection of the state, e.g., by clicking on the state, may cause a detailed map of the state to be presented. For example, if the state of Georgia is selected, a map of Georgia that depicts sub-regions of Georgia may be presented. The sub-regions of the state view may be counties, cities, telephone area codes, zip codes, or other ways of segmenting a larger region.

In some implementations, the level of granularity of a selection may be based on a zoom level of the interactive map user interface as the time the state was selected. For example, if the zoom level is greater than a threshold, e.g., greater than 100%, the selection may be deemed to be of a county, city, postal code, or area code within the state that corresponds to the location in the image where the selection occurred. In this example, the interactive map user interface 210 may be updated to present an image of a map of the selected county, city, postal code, or area code. If the zoom level is less than a threshold, e.g., less than 100%, the selection may be deemed to be of the entire state. In this example, the interactive map user interface 210 may be updated to present an image of a map of the selected state.

In some implementations, a selection of a state (or another type of user interaction), causes a user interface to be presented that enables a user to input or modify data. For example, selection of a state may cause an overlay to be presented that enables a user to modify or input a bid for a content item, select keywords for which the content item is distributed, or input another appropriate parameter. The data input to the overlay may be applied to the selected state. For example, if the user modifies a bid after selecting Georgia, the bid may be used in determining whether to present the content item on client devices located in Georgia.

In some implementations, selection of a state (or other sub-region) while the state is being presented for a particular campaign results in a toggle between active and inactive status for the campaign. For example, if the state is inactive for the campaign (e.g., content items for the campaign are not eligible to be provided to client devices located in the state), a selection of the state may toggle the status of the state to the active status for the campaign (e.g., contents items are eligible to be provided to client devices located in the state). In this example, the client device would provide, in response to the selection and to the data management system 110, data specifying that the state has been toggled for the campaign. In response, the data management system 110 may update distribution criteria for the campaign based on the change in status for the state.

Figure 3:
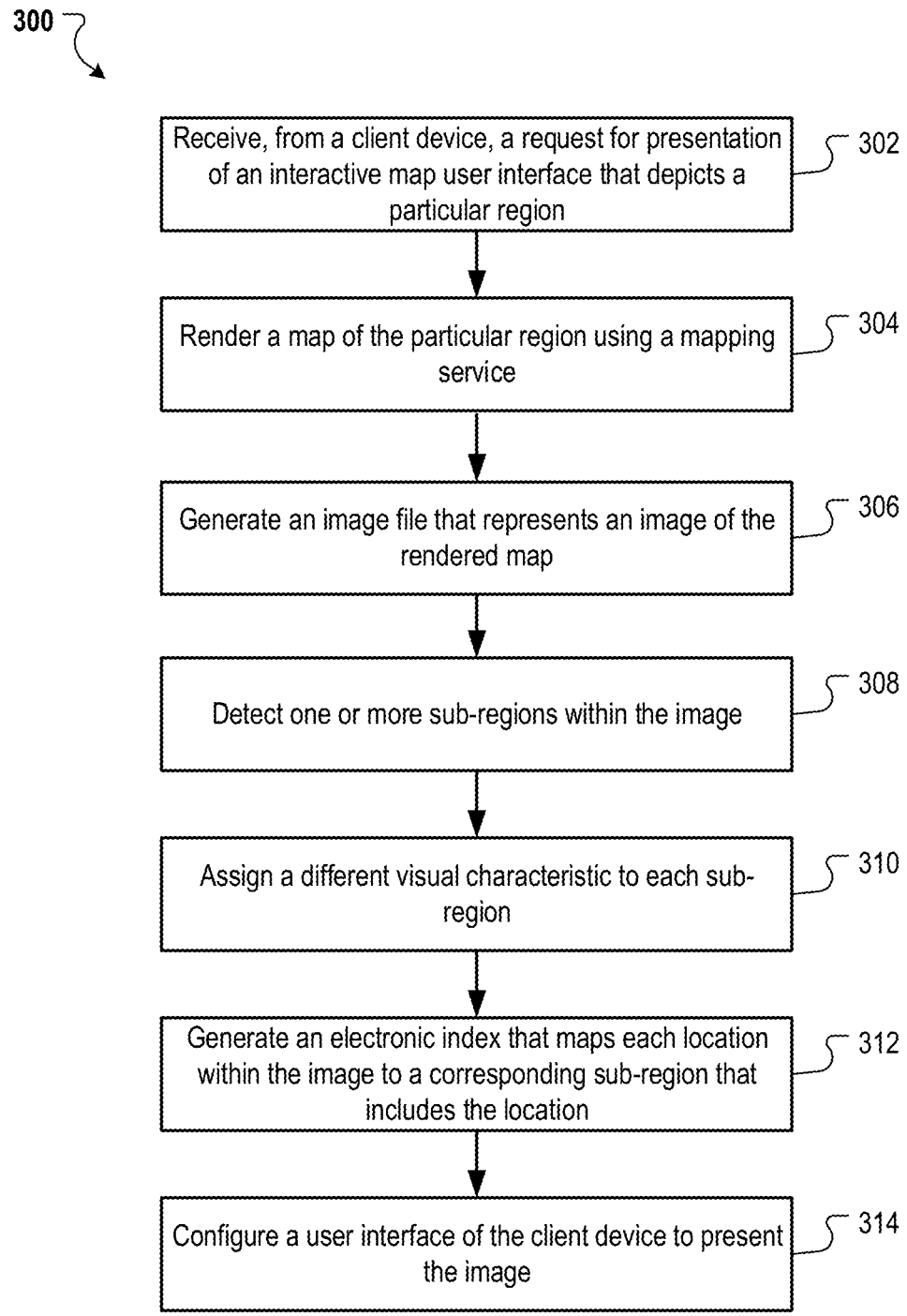
FIG. 3 is a flow chart of an example process for providing an interactive map user interface.

FIG. 3 is a flow chart of an example process 300 for providing an interactive map user interface. Operations of the process 300 can be implemented, for example, by one or more data processing apparatus, such as the data management system 110 of FIG. 1. The process 300 can also be implemented by instructions stored on computer storage medium, where execution of the instructions by a data processing apparatus cause the data processing apparatus to perform the operations of the process 300.

A request for presentation of an interactive map user interface is received (302). For example, a client device may submit a request for an interactive map user interface that depicts a particular geographic region. The request may also specify data related to the particular geographic region that a user of the client device would like to view. For example, the request may specify the geographic location of South America and selection data for a particular content item when the content item is presented at devices located in South America.

A map of the particular region is rendered using a mapping service (304). For example, as described above, a map client can interact with a mapping service to generate a map canvas, organize map tiles on the canvas, locate overlays over the map tiles, locate other map data on the map, and render the map, e.g., at a display or in memory. The rendering can include generating a canvas of the particular region and loading programming elements (e.g., scripts) and graphic elements (e.g., map tiles, overlays, etc.) that are used to generate the map.

An image file that represents an image of the rendered map is generated (306). For example, an image of the rendered map may be captured by taking a screenshot of a display that is presenting the rendered map. An image file that represents the captured image can then be generated. The image file may be a PNG, GIF, JPEG, or other appropriate image file format.

One or more sub-regions are detected within the image (308). For example, borders within the image may be detected using a border detection technique. The shapes between borders can then be compared to the shapes of known sub-regions of the particular geographic region to identify the sub-regions.

A different visual characteristic is assigned to each sub-region (310). For example, a different color may be assigned to each sub-region. The colors may be based on the RGB model or another appropriate computer-readable color model. In another example, the visual characteristics may be different shadings, hatchings, color intensities, or some other appropriate visual characteristic.

An electronic index is generated (312). The electronic index can map each location within the image to a corresponding sub-region that includes the location. The electronic index can also map each sub-region to data related to the sub-region. For example, the interactive map user interface may be requested to present particular data related to the sub-regions. The particular data for each sub-region can be included in the electronic index.

In some implementations, the electronic index maps x-y coordinates of each location to its corresponding sub-region. In some implementations, the electronic index maps the visual characteristics to the sub-regions. For example, the electronic index may map each sub-region to its unique RGB color.

Figure 4:
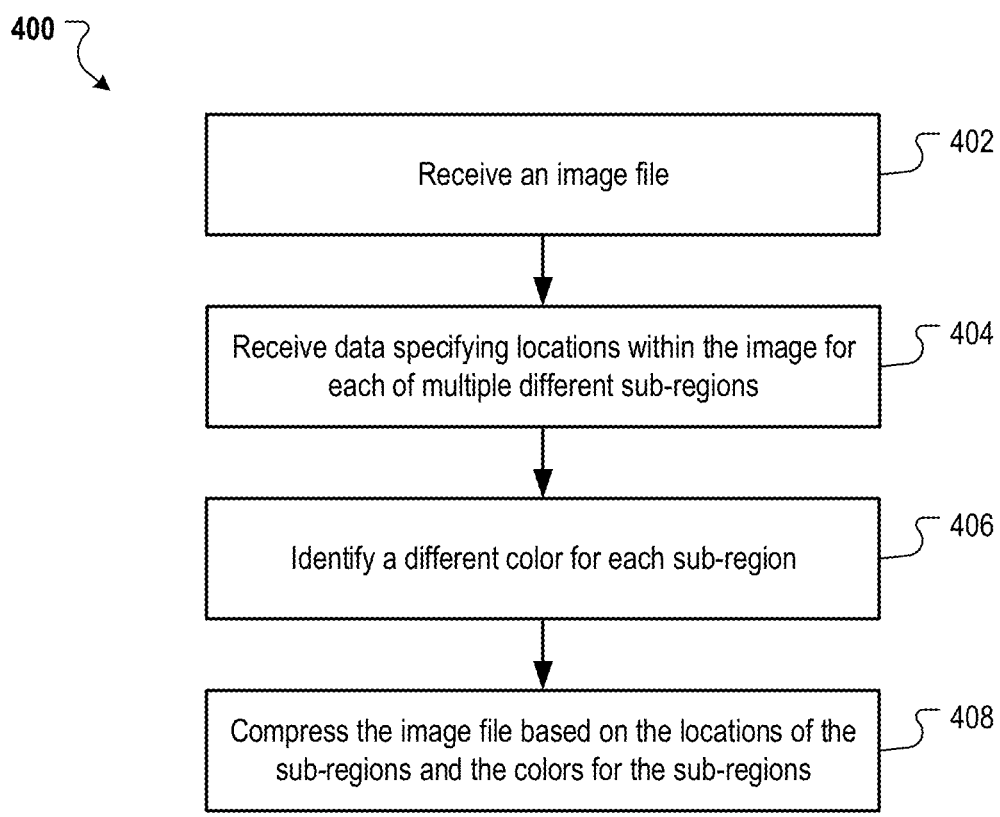
FIG. 4 is a flow chart of an example process for compressing an image file.

A user interface of the client device is configured to present the image (314). For example, data that causes presentation of the image may be provided to the client device. This data can include the image file representing the image, the electronic index, and code (e.g., routines or scripts) that cause the client device to present the image. This data may cause the image to be presented with each of the different sub-regions being presented according to the different visual characteristic that corresponds to the different sub-region. For example, each sub-region may be presented in its RGB color. In some implementations, the image file that represents the image may be compressed prior to transmitting the image file to the client device. An example process for compressing an image file is illustrated in FIG. 4 and described below.

The client device can access the electronic index in response to user interactions with the image. For example, if the user hovers a pointer over the location of a particular sub-region, the client device can detect the location (e.g., x-y coordinates) of the hover within the image. The client device can then access the electronic index to determine the sub-region being hovered and retrieve data for the sub-region from the electronic index. The client device can then present the retrieved data in the user interface, e.g., over the sub-region that received the user interaction.

The data provided to the client device can cause the client device to perform other operations in response to certain user interactions. For example, the client device may toggle the active/inactive status of a campaign for a particular sub-region in response to a selection of the image at the particular sub-region. In this example, a script may cause the client device to transmit to a content distribution system data specifying a toggle of the active/inactive status of the particular sub-region.

In another example, a selection of a particular sub-region may cause the client device to request a map of the particular sub-region. In this example, a script may cause the client device to access its cache to determine whether an image file representing an image of the particular sub-region is stored in the cache. If so, the client device can obtain the image file from the cache and present the image of the particular sub-region in the user interface. If not, the script can cause the client device to request an image of the map of the particular sub-region.

FIG. 4 is a flow chart of an example process 400 for compressing an image. Operations of the process 400 can be implemented, for example, by one or more data processing apparatus, such as the file compressor 129 of FIG. 1. The process 400 can also be implemented by instructions stored on computer storage medium, where execution of the instructions by a data processing apparatus cause the data processing apparatus to perform the operations of the process 400.

An image file is received (402). The image file may represent an image of a particular region and may depict sub-regions of the particular region. The image file may be a PNG, GIF, JPEG, or other appropriate image file format.

Data specifying locations within the image for each of multiple different sub-regions are received (404). For example, the data may specify, for each sub-region, the x-y coordinates (or ranges of x-y coordinates) within the image that correspond to each sub-region.

A different color is identified for each sub-region (406). For example, each sub-region may be assigned a different color based on the RGB color model.

The image file is compressed (408). The image file may be compressed based on the locations of each sub-region and the color assigned to each sub-region. For example, the image file may store, for each sub-region, the color assigned to the sub-region and its corresponding locations. Compressing an image in this way can result in a much lower cost per pixel (e.g., in terms of data size of the image per display pixel) when the image includes solid colored sub-regions as each sub-region can be represented in the image file using less data than if the sub-regions were multi-colored.

By compressing the image file in this way, the image file can be more quickly transmitted over a network and using less bandwidth than a non-compressed image file. In addition, a GPU of the client device can more quickly present the compressed image file than it could present a non-compressed image file that includes detailed data of each location within the image.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, from a client device, a request for presentation of an interactive map user interface that depicts (i) a particular geographic region and (ii) data for an online account, the data including, for each of multiple different sub-regions of the particular geographic region, performance data that represents a performance of content of the online account distributed in the sub-region;
    rendering, by one or more servers and using a mapping service, a map of the particular geographic region, the rendering comprising generating a canvas of the particular geographic region and loading a plurality of programming elements and graphic elements that are used to generate the map;
    generating, by the one or more servers and based on the rendered map, an image file representing an image of the rendered map, wherein the image file is a smaller file than the generated canvas and consumes less memory than the generated canvas;
    detecting the different sub-regions within the image based at least on visual borders depicted by the image;
    assigning a different visual characteristic to each different sub-region within the image;
    generating an electronic index (i) that maps each of multiple different locations within the image to the different visual characteristic of the sub-region that includes the location and (ii) that specifies the performance data for each sub-region; and
    configuring, by the one or more servers, a user interface of the client device to:
    present the image with each of the different sub-regions being presented according to the different visual characteristic corresponding to each different sub-region;
    monitor for user interactions with one or more of the sub-regions; and
    present, using the mapping of the electronic index, the performance data for at least one given sub-region when the client device detects a user interaction with the given sub-region of the image, wherein the configuring includes providing, by the one or more servers, the image file and the electronic index to the client device.

2. The method of claim 1, wherein the different visual characteristic of each sub-region comprises a particular color assigned to the sub-region based on the performance data for the sub-region and that is presented within the sub-region in the image.

3. The method of claim 1, further comprising reducing a data size of the image file using compression techniques that include:
    assigning, to each sub-region of the image, a particular red, green, blue (RGB) color in which the sub-region of the image is presented; and
    storing, in the image file and for each particular sub-region, the RGB color for the sub-region and data specifying locations of the particular sub-region within the image.

4. The method of claim 1, further comprising:
    receiving, at the one or more servers and from the client device, data specifying a selection of a particular location within the image;
    generating an updated image that depicts a map of the particular sub-region that corresponds to the selected location in response to the selection, the generating including rendering a map of the particular sub-region using the mapping service and generating an image of the rendered map; and
    providing, to the client device, a second image file representing the updated image.

5. The method of claim 4, further comprising:
    receiving, from the client device, data specifying a zoom level for the image at the time of the selection;
    determining, based on the zoom level, a level of granularity for the selection; and determining, based on the level of granularity for the selection, the particular sub-region that corresponds to the selected location.

6. The method of claim 1, wherein the image file comprises a Portable Network Graphics (PNG) file format.

7. The method of claim 1, further comprising providing, by the one or more servers and to the client device, one or more additional image files that each represents a map of at least one of the sub-regions in response to the request and prior to receiving a request for the one or more additional image files, wherein the client device stores the one or more additional image files in a cache.

8. The method of claim 1, wherein presenting, from the electronic index, the performance data for account data related to at least one given sub-region when the client device detects a user interaction with the given sub-region of the image comprises: identifying a particular visual characteristic of a location in the image at which the user interaction occurred; identifying, as the given sub-region and using the electronic index, a sub-region to which the particular visual characteristic is assigned; identifying, using the electronic index, the performance data for the given sub-region; and presenting the performance data for the given sub-region.

9. A system comprising:
    a first front-end server that receives, from client devices, requests for presentation of interactive map user interfaces that depict (i) a particular geographic region and (ii) data for an online account the data including, for each of multiple different sub-regions of the particular geographic region, performance data that represents a performance of content of the online account distributed in the sub-region;

a map rendering server in data communication with the front-end server and that uses a mapping service to render a map of the particular geographic region by generating a canvas of the particular geographic region and loading a plurality of programming elements and graphic elements that are used to generate the map;

a map image file generator that:

generates, based on the rendered map, an image file representing an image of the rendered map, wherein the image file is a smaller file than the generated canvas and consumes less memory than the generated canvas;

detects the different sub-regions within the image based at least on visual borders depicted by the image;

assigns a different visual characteristic to each different sub-region within the image; and generates an electronic index (i) that maps each of multiple different locations within the image to the different visual characteristic of the sub-region that includes the location and (ii) that specifies the performance data for each sub-region; and a second front-end server that configures a user interface of the client device to: present the image with each of the different sub-regions being presented according to the different visual characteristic corresponding to each different sub-region;

monitor for user interactions with one or more of the sub-regions; and present using the mapping of the electronic index, the performance data for account data related to at least one given sub-region when the client device detects a user interaction with the given sub-region of the image, wherein the configuring includes providing, by the second front-end server, the image file and the electronic index to the client device.

10. The system of claim 9, further comprising a file compressor that compresses a data size of an image file that stores the image by using compression techniques that include:

assigning, to each sub-region of the image, a particular red, green, blue (RGB) color in which the sub-region of the image is presented; and storing, in the image file and for each particular sub-region, the RGB color for the sub-region and data specifying locations of the particular sub-region within the image.

11. The system of claim 9, wherein the different visual characteristic of each sub-region comprises a particular color assigned to the sub-region based on the performance data for the sub-region and that is presented within the sub-region in the image.

12. The system of claim 9, wherein:

the first front-end server receives, from the client device, data specifying a selection of a particular location within the image;

the map image file generator generates an updated image that depicts a map of the particular sub-region that corresponds to the selected location in response to the selection, the generating including rendering a map of the particular sub-region using the mapping service and generating an image of the rendered map; and the second front-end server provides, to the client device, a second image file representing the updated image.

13. The system of claim 12, wherein:

the first front-end server receives, from the client device, data specifying a zoom level for the image at the time of the selection; the map rendering server determines, based on the zoom level, a level of granularity for the selection; and the map rendering server determines, based on the level of granularity for the selection, the particular sub-region that corresponds to the selected location.

14. The system of claim 9, wherein the image file comprises a Portable Network Graphics (PNG) file format.

15. The system of claim 9, wherein the second front-end server provides, to the client device, one or more additional image files that each represents a map of at least one of the sub-regions in response to the request and prior to receiving a request for the one or more additional image files, wherein the client device stores the one or more additional image files in a cache.

16. A non-transitory computer storage medium encoded with a computer program, the program comprising instructions that when executed by one or more data processing apparatus cause the data processing apparatus to perform operations comprising:

receiving, from a client device, a request for presentation of an interactive map user interface that depicts (i) a particular geographic region and (ii) data for an online account, the data including, for each of multiple different sub-regions of the particular geographic region, performance data that represents a performance of content of the online account distributed in the sub-region;

rendering, using a mapping service, a map of the particular geographic region, the rendering comprising generating a canvas of the particular geographic region and loading a plurality of programming elements and graphic elements that are used to generate the map;

generating, based on the rendered map, an image file representing an image of the rendered map, wherein the image file is a smaller file than the generated canvas and consumes less memory than the generated canvas;

detecting the different sub-regions within the image based at least on visual borders depicted by the image;

assigning a different visual characteristic to each different sub-region within the image;

generating an electronic index (i) that maps each of multiple different locations within the image to the different visual characteristic of the sub-region that includes the location and (ii) that specifies the performance data for each sub-region; and configuring a user interface of the client device to:

present the image with each of the different sub-regions being presented according to the different visual characteristic corresponding to each different sub-region;

monitor for user interactions with one or more of the sub-regions; and present using the mapping of the electronic index, the performance data for at least one given sub-region when the client device detects a user interaction with the given sub-region of the image, wherein the configuring includes providing the image file and the electronic index to the client device.

17. The non-transitory computer storage medium of claim 16, wherein the different visual characteristic of each sub-region comprises a particular color assigned to the sub-region based on the performance data for the sub-region and that is presented within the sub-region in the image.

18. The non-transitory computer storage medium of claim 16, wherein the operations further comprise reducing a data size of the image file using compression techniques that include: assigning, to each sub-region of the image, a particular red, green, blue (RGB) color in which the sub-region of the image is presented; and storing, in the image file and for each particular sub-region, the RGB color for the sub-region and data specifying locations of the particular sub-region within the image.

19. The non-transitory computer storage medium of claim 16, wherein the operations further comprise: receiving, from the client device, data specifying a selection of a particular location within the image; generating an updated image that depicts a map of the particular sub-region that corresponds to the selected location in response to the selection, the generating including rendering a map of the particular sub-region using the mapping service and generating an image of the rendered map; and providing, to the client device, a second image file representing the updated image.

20. The non-transitory computer storage medium of claim 19, wherein the operations further comprise: receiving, from the client device, data specifying a zoom level for the image at the time of the selection; determining, based on the zoom level, a level of granularity for the selection; and determining, based on the level of granularity for the selection, the particular sub-region that corresponds to the selected location.

\* \* \* \* \*